(12) United States Patent
Dilalan et al.

(10) Patent No.: US 9,885,278 B2
(45) Date of Patent: Feb. 6, 2018

(54) WASTEGATE VALVE AND METHOD FOR INSTALLING A WASTEGATE VALVE INTO THE TURBINE HOUSING OF AN EXHAUST-GAS TURBOCHARGER

(71) Applicant: CONTINENTAL AUTOMOTIVE GMBH, Hannover (DE)

(72) Inventors: Uemit Dilalan, Mannheim (DE); Christian Roemer, Tiefenthal (DE); Guenter Muench, Carlsberg (DE)

(73) Assignee: Continental Automotive GmbH, Hannover (DE)

( * ) Notice: Subject to any disclaimer, the term of this patent is extended or adjusted under 35 U.S.C. 154(b) by 415 days.

(21) Appl. No.: 14/432,816

(22) PCT Filed: Sep. 4, 2013

(86) PCT No.: PCT/EP2013/068285
§ 371 (c)(1),
(2) Date: Apr. 1, 2015

(87) PCT Pub. No.: WO2014/053279
PCT Pub. Date: Apr. 10, 2014

(65) Prior Publication Data
US 2015/0292395 A1 Oct. 15, 2015

(30) Foreign Application Priority Data
Oct. 1, 2012 (DE) ........................ 10 2012 217 920

(51) Int. Cl.
*F02B 37/18* (2006.01)
*F16K 1/20* (2006.01)

(52) U.S. Cl.
CPC .......... *F02B 37/186* (2013.01); *F02B 37/183* (2013.01); *F16K 1/20* (2013.01); *Y02T 10/144* (2013.01)

(58) Field of Classification Search
CPC ........ F02B 37/186; F02B 37/183; F16K 1/20; F16K 1/2007; B21D 37/16; B21D 5/0209;
(Continued)

(56) References Cited

U.S. PATENT DOCUMENTS 8,205,448 B2 6/2012 Koch et al.
8,459,022 B2 * 6/2013 Cizek .................... F01D 17/105
251/210
(Continued)

FOREIGN PATENT DOCUMENTS

CN 102678196 A 9/2012
DE 202010005747 U1 7/2010
(Continued)

OTHER PUBLICATIONS

JP 2000145470A Akita, Toshio May 2000—Machine Translation.*

*Primary Examiner* — David Bryant
*Assistant Examiner* — Lee A Holly
(74) *Attorney, Agent, or Firm* — Laurence A. Greenberg; Werner H. Stemer; Ralph E. Locher

(57) ABSTRACT

A wastegate valve includes a wastegate flap and a wastegate spindle, in which the wastegate flap and the wastegate spindle are constituent parts of a single, unipartite molded body. The molded body furthermore has a connecting arm which is disposed between the wastegate flap and the wastegate spindle and which has a plasticization region. A method for installing an exhaust-gas turbocharger wastegate valve of this type into a turbine housing which has a wastegate duct, is also provided.

6 Claims, 2 Drawing Sheets

(58) Field of Classification Search
CPC ........... B21D 5/00; B21D 5/02; F01D 17/105; C08K 5/19
See application file for complete search history.

(56) References Cited

U.S. PATENT DOCUMENTS

| | | |
|---|---|---|
| 8,733,101 B2 | 5/2014 | Hoshi et al. |
| 2007/0119170 A1 | 5/2007 | Masson et al. |
| 2011/0175025 A1 | 7/2011 | Schall |

FOREIGN PATENT DOCUMENTS

| | | |
|---|---|---|
| DE | 102010060193 A1 | 4/2011 |
| DE | 112009002098 T5 | 7/2011 |
| DE | 102010043147 A1 | 10/2011 |
| DE | 102011017523 A1 | 10/2012 |
| EP | 2444625 A1 | 4/2012 |
| EP | 2489853 A1 | 8/2012 |
| JP | 2000145470 A * | 5/2000 |
| WO | 2008071254 A1 | 6/2008 |

* cited by examiner

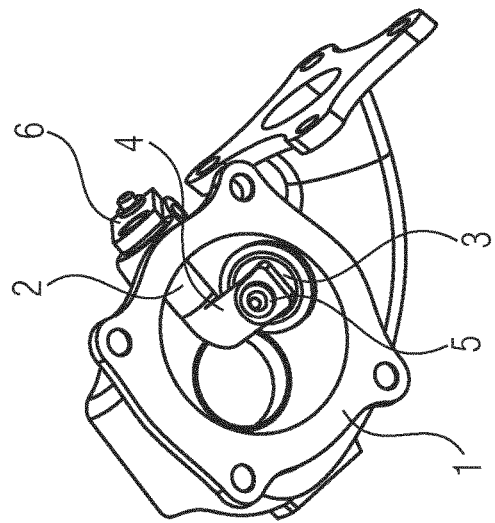
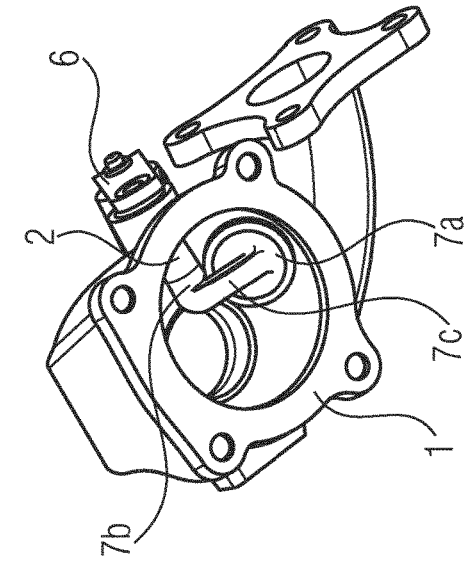
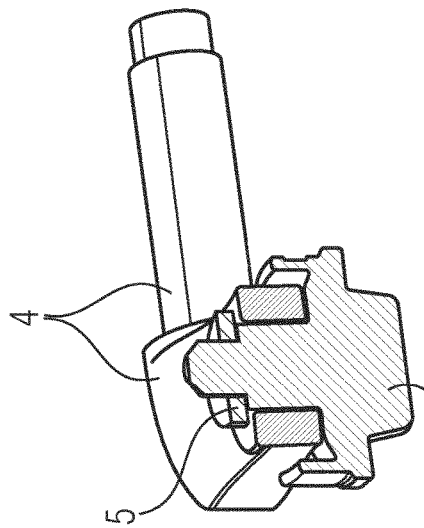
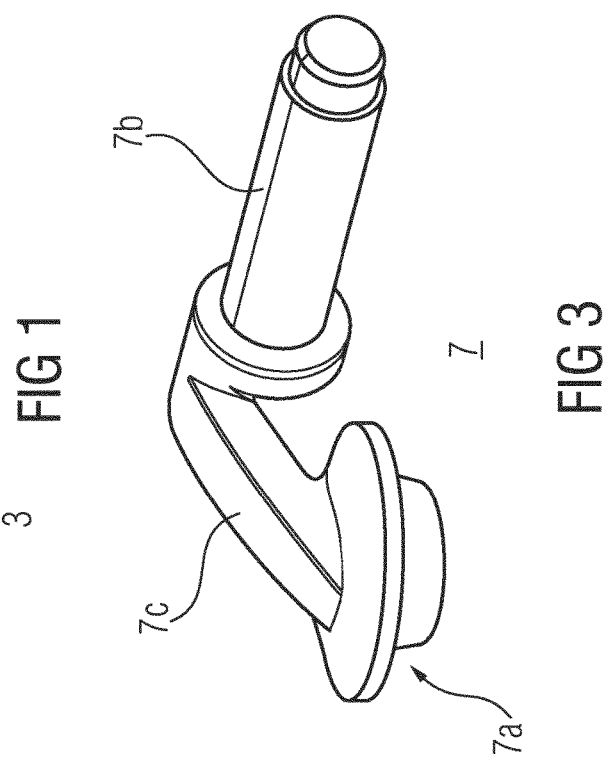

WASTEGATE VALVE AND METHOD FOR INSTALLING A WASTEGATE VALVE INTO THE TURBINE HOUSING OF AN EXHAUST-GAS TURBOCHARGER

BACKGROUND OF THE INVENTION

Field of the invention

The invention relates to a wastegate valve and to a method for installing a wastegate valve into the turbine housing of an exhaust-gas turbocharger.

Exhaust-gas turbochargers serve for improving the efficiency of an internal combustion engine and thus increasing the power thereof. For this purpose, an exhaust-gas turbocharger has a turbine with a turbine wheel, which is arranged in the exhaust-gas mass flow of the internal combustion engine, and a compressor with a compressor wheel. The turbine wheel and the compressor wheel are fastened to a common shaft. During the operation of the exhaust-gas turbocharger, the turbine wheel is driven by the exhaust-gas mass flow of the internal combustion engine, and in turn, drives the compressor wheel. The compressor compresses fresh intake air and conducts the compressed fresh air to the internal combustion engine. Said shaft is mounted in a bearing housing. The turbine wheel is arranged in turbine housing, and the compressor wheel is arranged in compressor housing.

It is already known to provide, in the turbine housing of an exhaust-gas turbocharger, a wastegate duct through which, when required, a part of the exhaust-gas mass flow of the internal combustion engine can be conducted, bypassing the turbine wheel, directly into an exhaust pipe of the internal combustion engine for the purpose of regulating the charge pressure. Said wastegate duct can be opened and closed using a wastegate valve. For the actuation of the wastegate valve, use is for example made of a pneumatic actuating device which is fastened to the compressor housing of the exhaust-gas turbocharger and which acts on the wastegate valve via an actuating rod. The wastegate valve has a wastegate spindle and a wastegate flap, which are initially different components that are riveted to one another using a washer. In this case, a degree of play is set such that the wastegate flap can lie against the sealing surface of the wastegate duct in the turbine housing and thus seal off the wastegate duct.

A disadvantage of this approach is that, owing to the stated play, rattling can occur during the operation of the exhaust-gas turbocharger. This is associated with undesired generation of noise. Furthermore, over the course of time, vibrational friction wear occurs at those surfaces of the wastegate flap which make contact with the sealing surface of the wastegate duct, and also at other contact surfaces in the system. As the degree of play increases, both the generation of noise and the wear also increase. This can lead to failure of the regulation of the wastegate valve.

EP 2 489 853 A1 has already disclosed a wastegate valve which has a wastegate flap and a wastegate spindle, wherein the wastegate flap and the wastegate spindle are constituent parts of a single unipartite molded body, and wherein the molded body has a connecting piece arranged between the wastegate flap and the wastegate spindle. In this case, the problem of rattling noises is not relevant, but it is necessary for additional design measures to be implemented at the sealing surfaces between wastegate flap and valve flap seat in order to ensure sealing closure of the wastegate valve.

BRIEF SUMMARY OF THE INVENTION

It is the object of the invention to specify a way in which the disadvantages described above can be eliminated.

Said object is achieved by means of a wastegate valve having the features specified below and by means of a method for the installation of said wastegate valve having the features specified below. Advantageous refinements and embodiments of the invention are specified in the dependent claims.

According to the present invention, the wastegate flap and the wastegate spindle of a wastegate valve are constituent parts of a single unipartite molded body, which molded body furthermore has a connecting arm which is arranged between the wastegate flap and the wastegate spindle and which has a plasticization region. A wastegate valve of said type can advantageously be installed into the turbine housing, which has a wastegate duct, of an exhaust-gas turbocharger by virtue of the molded body being inserted into the turbine housing, the wastegate spindle of the molded body being pushed through a bushing that has been inserted into a bore of the turbine housing, the wastegate spindle being fastened to a counterpart, the predefined plasticization region of the connecting arm arranged between the wastegate flap and the wastegate spindle being heated, and the connecting piece being deformed, by exertion of force on the wastegate flap, such that the wastegate flap lies sealingly against the associated valve seat in the turbine housing and thus fully closes the wastegate duct. In this case, the plasticization region of the connecting arm is preferably heated with such intensity that the material can be plastically, that is to say permanently, deformed with greatly reduced or only low expenditure of force. After said deformation process, the plasticization region is cooled again, wherein the deformation is maintained.

The advantages of a wastegate valve of said type and of the installation thereof into the turbine housing of an exhaust-gas turbocharger consist in particular in that rattling, such as occurs in the case of known wastegate valves owing to the presence of play between wastegate flap, wastegate spindle and washer, during the operation of the exhaust-gas turbocharger is no longer possible. Furthermore, a cost saving is attained because the wastegate flap, the wastegate spindle and a connecting piece arranged between the wastegate flap and the wastegate spindle are constituent parts of a single unipartite molded body, and no washer is required for the connection of the wastegate flap to the wastegate spindle. Consequently, the method step of fastening the wastegate flap to the wastegate spindle, as is required in the prior art, is also eliminated. Furthermore, the durability of the wastegate valve is increased, because no notch effect as a result of riveting, welding etc. can occur. Wear between wastegate flap, wastegate spindle and washer is eliminated. Also, no rattling-induced wear occurs between the wastegate spindle and the bushing of the turbine housing through which the wastegate spindle is guided.

BRIEF DESCRIPTION OF THE SEVERAL VIEWS OF THE DRAWING

Further advantageous properties of the invention will emerge from the exemplary explanation thereof below on the basis of the figures, in which:

FIG. 1 is a sketch illustrating a wastegate valve according to the prior art,

FIG. 2 is a sketch illustrating the installation of the wastegate valve shown in FIG. 1 into the turbine housing of an exhaust-gas turbocharger, FIG. 3 is a sketch illustrating a wastegate valve according to an exemplary embodiment of the invention, FIG. 4 is a sketch illustrating the installation of the wastegate valve shown in FIG. 3 into the turbine housing of an exhaust-gas turbocharger.

DESCRIPTION OF THE INVENTION

Figure 5:
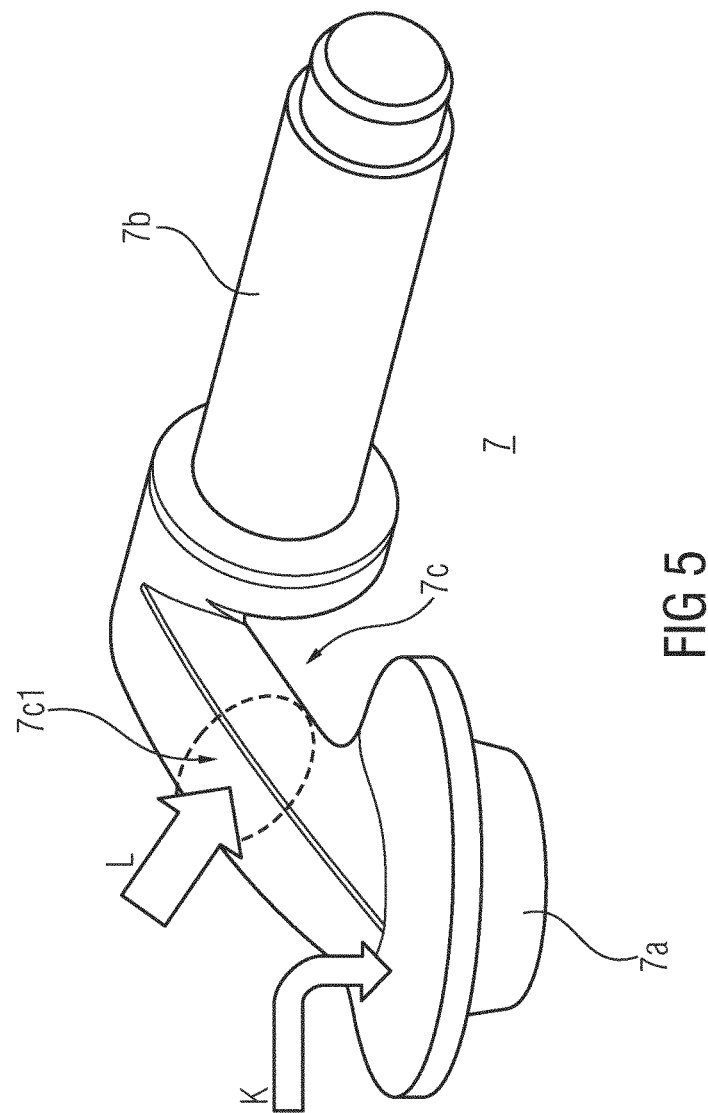
FIG. 5 is a sketch of the wastegate valve shown in FIG. 3 illustrating the deformation thereof during the installation into the turbine housing of an exhaust-gas turbocharger.

FIG. 1 shows a wastegate valve according to the prior art. Said wastegate valve has a wastegate spindle 4, a washer 5 and a wastegate flap 3. The wastegate flap 3 is riveted to the wastegate spindle 4 using the washer 5. The degree of play that remains with this riveted connection is set such that, when the wastegate valve assembled and riveted together from multiple components is installed into the turbine housing of an exhaust-gas turbocharger which has a wastegate duct, the wastegate flap 3 can lie against the sealing surface provided in the turbine housing and thus seals off the wastegate duct.

FIG. 2 is a sketch illustrating the installation of the wastegate valve shown in FIG. 1 into the turbine housing of an exhaust-gas turbocharger which has a wastegate duct. For this installation, the wastegate valve assembled and riveted together from multiple components is firstly inserted into the turbine housing 1. Subsequently, the wastegate spindle 4 of the wastegate valve is pushed through a bushing 2 that has been inserted into a bore of the turbine housing 1. Subsequently, the wastegate spindle 4 is fastened to a counterpart 6, which is a lever which interacts with an actuating rod (not illustrated in the figure) during the operation of the exhaust-gas turbocharger. The wastegate spindle 4 is mounted rotatably in the bushing 2. When the wastegate spindle 4 has been fastened to the counterpart, it is then the case, owing to the stated play, that the wastegate flap lies against the sealing surface in the turbine housing 1 and seals off the wastegate duct. During the operation of the exhaust-gas turbocharger, the wastegate flap can, by virtue of the wastegate spindle 4 being rotated, be opened to a greater or lesser extent in order to conduct a greater or lesser part of the exhaust gas through the wastegate duct past the turbine wheel directly into an exhaust pipe of the internal combustion engine, and thus realize charge pressure regulation.

The device discussed on the basis of FIGS. 1 and 2 however has the disadvantage that, owing to the stated play, rattling occurs during the operation of the exhaust-gas turbocharger. This is associated with undesired generation of noise. Furthermore, vibrational friction wear occurs at the contact surfaces between the components of the wastegate valve itself and at that surface of the wastegate flap which makes contact with sealing surface in the turbine housing, which vibrational friction wear can, over the course of time, lead to failure of the regulation of the wastegate valve, that is to say of the charge pressure regulation.

FIG. 3 is a sketch illustrating a wastegate valve according to an exemplary embodiment of the invention, with the use of which the disadvantages encountered with the wastegate valve shown in FIG. 1 are eliminated.

The wastegate valve shown in FIG. 3 is a single unipartite molded body 7 which has, as constituent parts, a wastegate flap 7a, a wastegate spindle 7b and a connecting arm 7c which is arranged between the wastegate flap and the wastegate spindle and which has a plasticization region 7c1. Said molded body 7 is a casting which is preferably produced either by powder injection molding or by precision casting.

To produce the wastegate valve by powder injection molding, metal powder is mixed with a binding agent and then worked in an injection molding process. The binding agent, which is for example a wax mixture, is subsequently removed from the green product formed during the injection molding process, said removal being effected by heating of said green product. After the binding agent has been removed, the green product that has had the wax mixture removed from it is sintered in order to produce the finished wastegate valve. If required, the finished wastegate valve may also be subjected to surface treatment.

FIG. 4 is a sketch illustrating the installation of the wastegate valve shown in FIG. 3 into the turbine housing, which has a wastegate duct, of an exhaust-gas turbocharger. For this installation process, the wastegate valve 7, which is present in the form of a unipartite molded body, is firstly inserted into the turbine housing 1. Subsequently, the wastegate spindle 7b of the molded body 7 is pushed through a bushing 2 that has been inserted into a bore of the turbine housing 1. Subsequently, the wastegate spindle 7b is fastened to a counterpart 6, which is a lever which interacts with an actuating rod (not illustrated in the figure) during the operation of the exhaust-gas turbocharger. The wastegate spindle 7b is mounted rotatably in the bushing 2. When the wastegate spindle 7b has been fastened to said counterpart 6, then in a further step, a predefined plasticization region 7c1 (see FIG. 5) of the connecting arm 7c arranged between the wastegate flap 7a and the wastegate spindle 7b is heated. When said plasticization region 7c1 of the connecting piece 7 has been brought into an easily deformable state as a result of the heating, the connecting piece 7c is deformed by virtue of a force being exerted on the wastegate flap 7a such that the wastegate flap 7a lies sealingly against the associated valve seat in the turbine housing and fully closes the wastegate duct.

Said heating of the predefined plasticization region 7c1 of the connecting arm 7c is preferably performed by means of a laser, as the use of laser radiation makes it possible, with relatively little outlay and in targeted fashion, for a predefined strictly limited plasticization region of the connecting arm to be intensely heated so as to be brought into a "soft", easily deformable state in which, through exertion of a relatively low force on the wastegate flap, it is achieved that the wastegate flap adapts in terms of its position to the associated valve seat in the turbine housing and lies sealingly against the sealing surface thereof in the turbine housing and thus seals off the wastegate duct. The associated deformation of the predefined plasticization region 7c1 of the connecting arm 7c is not reversible, that is to say is maintained when the plasticization region cools again, such that a permanent deformation of the predefined plasticization region of the connecting arm is realized. By means of this permanent deformation of the predefined plasticization region of the connecting arm 7c, manufacturing-induced defects of the sealing surface of the wastegate flap relative to the contact surface, that is to say relative to the valve seat in the turbine housing, are compensated. This results in reliable closure of the wastegate flap during the operation of the exhaust-gas turbocharger.

As an alternative to heating of the predefined plasticization region 7c1 by means of a laser, heating of the predefined plasticization region may also be performed by inductive heating, by heating using a burner, by heating using electrodes, or in some other way.

In the above manner, according to the present invention, a wastegate valve in the form of a single unipartite molded body is provided, which has as constituent parts a wastegate flap, a wastegate spindle and a connecting arm arranged in between. For installation into the turbine housing of an exhaust-gas turbocharger, said molded body can be inserted into the turbine housing and fastened in the manner described above. Subsequently, a plasticization region, which is to be deformed, of the connecting arm is heated to a temperature that is adequate for hot forming. Said temperature is dependent on the material from which the molded body is formed, and must be high enough that, under the action of a defined relatively low force, the connecting piece between the wastegate flap and the wastegate spindle can be permanently plastically deformed such that the wastegate flap lies against the sealing surface in the turbine housing such that the wastegate duct is fully closed.

FIG. 5 is a sketch of the wastegate valve shown in FIG. 3, illustrating the deformation thereof during the installation into the turbine housing of an exhaust-gas turbocharger. The illustrated wastegate valve, which is a single unipartite molded body, has a wastegate flap 7a, a wastegate spindle 7b and a connecting arm 7c arranged between the wastegate flap and the wastegate valve. The connecting arm 7c has a predefined plasticization region 7c1 which, during the installation of the wastegate valve into the turbine housing of an exhaust-gas turbocharger, is heated for example by means of laser radiation L and is then, through application of a force indicated by the arrow K, plastically deformed such that the wastegate flap 7a fully closes the wastegate duct.

The invention claimed is:

1. A method for installing a wastegate valve into a turbine housing of an exhaust-gas turbocharger having a wastegate duct, the method comprising the following steps:

providing a wastegate flap and a wastegate spindle being constituent parts of a single unipartite molded body having a connecting arm between the wastegate flap and the wastegate spindle and the connecting arm having a predefined plasticization region;

inserting the molded body into the turbine housing;

pushing the wastegate spindle of the molded body through a bushing inserted into a bore of the turbine housing;

fastening the wastegate spindle of the molded body to a counterpart;

heating the predefined plasticization region of the connecting arm disposed between the wastegate flap and the wastegate spindle; and deforming the connecting arm in the plasticization region by exerting a force on the wastegate flap causing the wastegate flap to fully close the wastegate duct.

2. The method according to claim 1, which further comprises fastening the wastegate spindle of the molded body to a lever.

3. The method according to claim 1, which further comprises performing the step of heating the predefined plasticization region of the connecting arm disposed between the wastegate flap and the wastegate spindle by using a laser.

4. The method according to claim 1, which further comprises performing the heating step by inductively heating the predefined plasticization region of the connecting arm disposed between the wastegate flap and the wastegate spindle.

5. The method according to claim 1, which further comprises performing the step of heating the predefined plasticization region of the connecting arm disposed between the wastegate flap and the wastegate spindle by using a burner.

6. The method according to claim 1, which further comprises performing the step of heating the predefined plasticization region of the connecting arm disposed between the wastegate flap and wastegate spindle by using electrodes.

* * * * *